United States Patent [19]

Cowan

[11] 4,305,486

[45] Dec. 15, 1981

[54] DUAL DAMPING CONTROL VALVE SHOCK ABSORBER

[75] Inventor: Arnold A. Cowan, Encino, Calif.

[73] Assignee: Interpart Corporation, Gardena, Calif.

[21] Appl. No.: 83,823

[22] Filed: Oct. 11, 1979

[51] Int. Cl.$^3$ ............................................. F16F 9/46
[52] U.S. Cl. ................................. 188/319; 188/299; 188/282
[58] Field of Search ............... 188/280, 281, 287, 282, 188/285, 284, 289, 317, 299, 319, 278; 267/8 A, 64 R, 65 R; 137/516.11, 517

[56] References Cited

U.S. PATENT DOCUMENTS

| 2,780,321 | 2/1957 | Sturari | 188/319 |
| 3,559,776 | 2/1971 | Schultze | 188/299 |
| 3,848,710 | 11/1974 | Thompson et al. | 188/280 |

*Primary Examiner*—Douglas C. Butler

*Attorney, Agent, or Firm*—Cislo, O'Reilly & Thomas

[57] ABSTRACT

A shock absorber, in an exemplary embodiment, especially adaptable for use on motorcycles and the like vehicles, wherein the shock absorber utilizes a piston member having at least a compression and rebound orifices through which fluid flows, and wherein first and second metering rods are selectively positionable into and out of the compression and rebound orifices respectively control the rate of fluid flow therethrough so as to vary the compression and rebound modes of the shock absorber. The metering rods take the form of co-axial, concentric, needle-like valves extending within a hollow shaft, or the piston rod, wherein each of the metering rods is independently and selectively manipulable and adjustable from an external position of the shock absorber thereby allowing selective manipulation of fluid flow through the piston of the shock absorber, depending upon end results desired with regard to shock absorber function.

9 Claims, 3 Drawing Figures

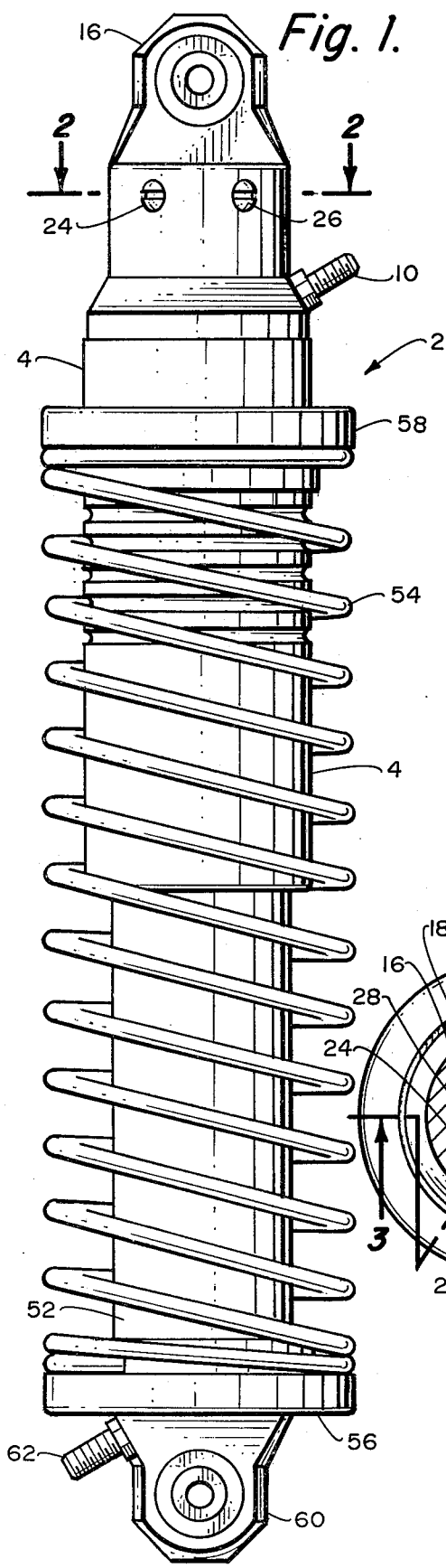
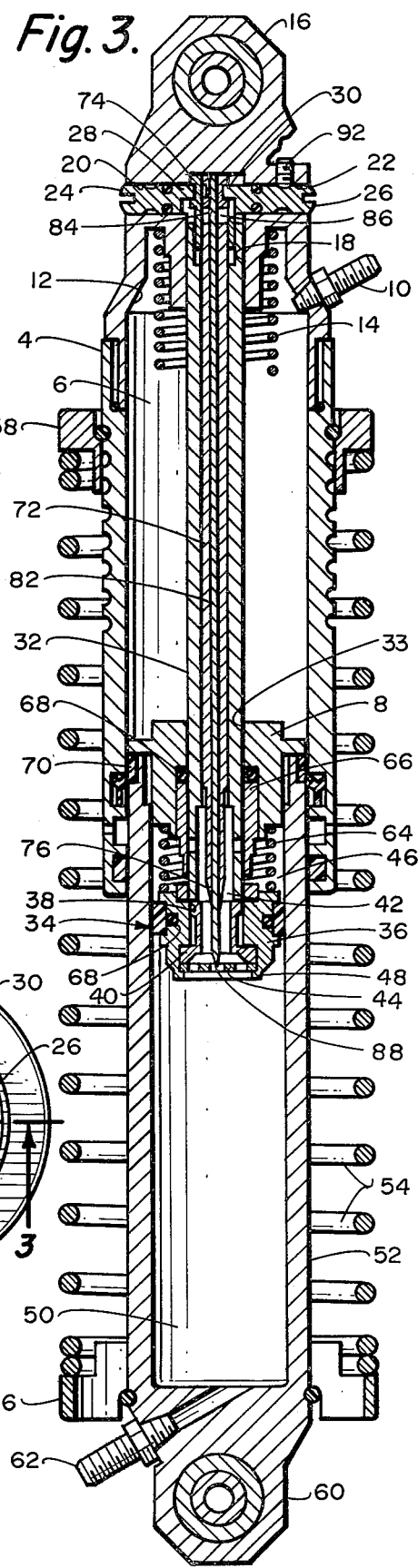

DUAL DAMPING CONTROL VALVE SHOCK ABSORBER

BACKGROUND OF THE INVENTION

High performance demands made on modern day motorcycles which may be used for pleasure driving or racing on a wide variety of surfaces under varying conditions, dictates the importance of being able to have a shock absorber whose function may be effectively and selectively varied for handling, comfort and safety of the motorcycle rider for the motorcycles with which shock absorbers are used.

In operation, a shock absorber must necessarily effectively absorb the high impact forces encountered during high speeds on regular as well as irregular riding surfaces. The shock absorber must also permit the wheels to return to the ground or surface as quickly as possible without inducing bounce so as to maintain optimum traction conditions for effective control of the vehicle, for example, motorcycle.

Although it is ordinarily the load spring which actually absorbs the forces of impact, it is the action of the damping unit, such as the shock absorber, which controls the rate of wheel travel during the compression and rebound phases of the shock absorber. In present day shock absorber design, the rebound rate is made slower than the compression rate in order to provide faster impact absorption on compression of the shock absorber and in a slower return on the rebound to prevent too rapid recoil or a catapult effect.

It has been found that even with the same load spring and motorcycle, different damping compression and rebound rates are required to achieve optimum performance of the vehicle, or for example motorcycle, for the different terrains encountered.

Most shock absorbers have fixed ratios between compression and rebound damping. Some shock absorbers have adjustable rebound damping, but the shock absorber must be removed or partially disassembled from the motorcycle with which it is used in order to allow for adjustment.

While there is one prior art device known of, as set forth in U.S. Pat. No. 3,848,710 to Thompson and Cowan, the device shown therein allows for external adjustment without disassembly of a shock absorber, but only for fluid flow during one functional mode of the shock absorber. In contradistinction, the present invention is directed to a shock absorber wherein control of fluid flow through a piston of the shock absorber may be had during the compression and rebound phases of the shock absorber. Additionally, the metering means used to obtain different flow rates through the compression orifice and the rebound orifice of the shock absorber are independently adjustable from an external position, so that the shock absorber need not be disassembled in order to achieve adjustment for varying surfaces or terrains with which the shock absorber of the invention may be used.

OBJECTS AND SUMMARY OF THE INVENTION

It is an object of the invention to provide a shock absorber for motor vehicles wherein fluid flow of the shock absorber for compression and rebound conditions may be selectively controlled.

It is another object of the invention to provide a shock absorber having a dual metering means for effectively metering fluid flow in a shock absorber during compression and rebound modes thereof.

It is still another and further object of the invention to provide a shock absorber which has external adjustment means whereby the metering orifices of a shock absorber through which fluid flows, during compression and rebound conditions, may be selectively varied.

It is still another and further object of the invention to provide a shock absorber which provides externally adjustable means whereby the shock absorber may be varied to meet a variety of driving conditions divergent in needs for shock absorbing functions.

It is still another and further more specific object of the invention to provide a shock absorber having a reciprocal piston therein and having at least compression and rebound orifices wherein metering means are externally adjustable so as to vary the area of fluid flow through said compression and rebound orifices.

It is still another and even further specific object of the invention to provide a shock absorber having metering means which provides simple and easy accessibility to independently adjust fluid flow for both compression and rebound damping of hydraulic fluid in a shock absorber.

It is still another even further more specific object of the invention to provide first and second metering means which are coaxial and concentric needle-like valves disposed for shiftable movement into and out of the orifices within a shock absorber through which fluid flows during compression and rebound functions of the shock absorber.

In an exemplary embodiment, the invention is directed to a shock absorber having a pressure tube with a reciprocal piston therein wherein the piston has a primary fluid passageway through which fluid flows during a compression stroke, and a secondary passageway through which fluid flows during a rebound stroke. The fluid flow takes place from one side of the piston to the other, and the shock absorber involves an improvement which comprises a first metering means for selectively metering fluid flow through said piston during the compression mode and a second metering means for selectively metering fluid flow through the piston during the rebound mode, the first and second metering means being externally adjustable so as to vary the rate of fluid flow through said piston.

These and further objects of the invention will become apparent from the hereinafter following commentary taken in conjunction with the drawing which is for purposes of illustration only.

BRIEF DESCRIPTION OF THE DRAWINGS

FIG. 1 is an elevational view of one type of shock absorber with which the dual metering concept of the invention may be utilized.

FIG. 2 is a view taken along the line 2—2 of FIG. 1, and

FIG. 3 is a view, partially broken away, taken along the line 3—3 of FIG. 2 to illustrate specific details of construction of the inventive shock absorber.

DESCRIPTION OF THE BEST EMBODIMENTS CONTEMPLATED

Referring to the figures of drawing wherein like numerals of reference designate like elements throughout, it will be noted that in this particular instance, shock absorber 2 comprises a first pressure tube 4 forming a first chamber 6 in conjunction with packing or bearing nut member 8 having fill valve 10 by which chamber 6 may be pressurized with gaseous fluid such as air. The upper portion 12 of first pressure tube 4 is provided with bottom-out spring 14, and terminates in terminus 16 by which the shock absorber 2 may be attached to an unsprung mass or the like.

Upper portion 16 is provided with a vertical bore 18, and two horizontal, radially spaced bores 20 and 22 receiving therein eccentric cam members 24 and 26 respectively, having stub shaft ends 28 and 30 respectively for purposes which will become apparent as the description proceeds.

Disposed within the vertical bore 18 is hollow piston shaft 32 extending through bore 33 in member 8 and terminating in piston assembly 34.

Piston assembly 34 comprises piston member 36 having a central passageway 38 formed in conjunction with poppet valve member 40.

Suffice to say that piston member 34 has at least one compression orifice 42, and one rebound orifice 44 through which hydraulic fluid flows from one side 46 to the other side 48 of piston assembly 34, within the chamber 50 formed by second pressure tube 52 shock having main spring 54 retained in position by means of lower retainer 56 and upper retainer 58, and disposed for attachment via terminus 60 to the other end of an unsprung vehicle mass, and wherein the chamber 50 also may be pressurized if desired via fill member 62. Second pressure tube 52 of metal construction performs an equivalent damping function as found in prior art shock absorbers.

Suffice to say that the pressure tube 4 in conjunction with the cooperative assembly, and piston assembly 34 is telescopically cooperative with pressure tube 52 in the depicted shock absorber device.

To the depicted shock absorber structure, top out spring 64 is also provided, as are the usual bushing 66, O-ring seal 68 and seals 70, as those of ordinary skill in the art will recognize.

Disposed within hollow piston tube 32 is first metering means 72 taking the form of an elongate hollow rod having a groove 74 at the upper portion thereof so as to receive the stub shaft component of cam member 24. It will be noted that the terminus 76 of first metering member 72 is of lesser diameter than the remainder thereof, and is linearly shiftable or movable into and out of at least the compression orifice 42 so that by movement into and out of orifice 42, the amount of fluid flow therethrough is varied in accordance with the position of first metering means 72.

Concentrically and axially received within first metering means 72 is second metering means 82, in this instance of slightly longer length than first metering means 72, and having its upper terminus 84, which is grooved as at 86 so as to receive the stub shaft configuration of rebound cam member 26 whereby rotation of cam member 26 will linearly shift second metering means 82 and more specifically, the pointed end 88 thereof into and out of the rebound piston orifice 44, so as to vary the fluid flow therethrough during rebound conditions.

In order to insure that positioning of either of the cam members 24 and 26 is in secure retainment, set screw, for example 92 may be provided so as to insure the cam members 24, 26 not rotating so as to vary their placement within the orifices in the manner selected for the various end conditions desired.

Thus, in use of the inventive concept, those of ordinary skill in the art will recognize that by inserting a tool or the like within the slotted ends of, for example, cam member 24 and rotating the same, rotation will cause linear movement of first metering rod means 72 into and out of the compression orifice 42 so as to vary the rate of fluid flow therethrough. Likewise, rotation of the cam 26 will cause the second metering means 82, and more specifically its pointed end thereof, to be positioned within rebound piston orifice 44 to again vary the fluid flow during rebound conditions.

More specifically, as in the conventional shock absorber, hydraulic fluid, and the like, is disposed in a first chamber 6 and upon the mass to which the shock absorber 2 is connected, being subjected to an impact, the hydraulic fluid flows through the piston and, more specifically, the compression orifice 42 into the chamber 50, formed by second pressure tube 52. The first metering means 72 is selectively positioned within this orifice to allow lesser or greater fluid flow therethrough, depending upon desired end results. Thus, during the compression stroke of shock absorber 2, hydraulic fluid is metered through the compression orifice by means of first metering means 72. Contrariwise, during the rebound stroke wherein hydraulic fluid flow is reversed, the flow of fluid will be through rebound orifice 44 within which is disposed second metering means 82, again in a selective manner, to either permit more or less fluid flow during the rebound stroke.

Thus, there has been described a shock absorber having the ability to meter fluid flow during both compression and rebound modes of shock absorber operation. The metering means utilized to meter fluid flow are externally accessible and easily adjustable in order to achieve the end functions desired.

While the invention has been depicted in conjunction with a combination gas and hydraulic fluid type of shock absorber, those of ordinary skill in the art will at once recognize that other shock absorbers not having the gaseous fluid capability, can also be adapted to make use of the dual metering valve arrangement of the invention for controlling fluid flow of hydraulic fluid during compression and rebound modes of the conventional shock absorber.

While specific configuration and design of the various components is shown, those of ordinary skill in the art will recognize that various modifications and changes may be made, and the specific mechanical matters relating to the basic piston assembly and components thereof, as well as the remainder of the shock absorber, not directly related to the dual valve control concept, may be obtained by reference to U.S. Pat. No. 4,848,710, the contents of which is hereby incorporated by reference.

Modifications, changes and alternatives that those of ordinary skill in the art will resort to or recognize, are all intended to be covered by the appended claims.

I claim:

1. In a shock absorber having a pressure tube with a reciprocable piston therein wherein a hollow piston rod extends from said piston to a terminal portion of said shock absorber adapted to be attached to an unsprung mass, said piston having a primary fluid passageway through which fluid flows through during a compression stroke and a secondary passageway through which said fluid flows during a rebound stroke, said fluid flow taking place from one side of said piston to the other, the improvement which comprises: a first metering means for selectively metering fluid flow through said piston during the compression mode and a second metering means for selectively metering fluid flow through said piston during the rebound mode, said first and second metering means being externally adjustable so as to vary the rate of fluid flow through said piston, said first and second metering means being disposed within said hollow piston rod and being coaxially and concentrically disposed with respect to each other, said first metering means having an axial bore and being shiftably movable into and out of a central orifice within said piston through which fluid flows during the compression stroke of said piston, and said second metering means being shiftably movable within said first metering means into and out of a central orifice within said piston through which fluid flows during the rebound stroke of said piston.

2. The shock absorber in accordance with claim 1 wherein each of said metering means have lengths at least as long as said hollow piston rod.

3. The shock absorber in accordance with claim 2 wherein each of said metering means have termini adjacent their respective orifices of smaller diameter than the remainder thereof.

4. The shock absorber in accordance with claim 2 including first and second adjustment means for said first and second metering means respectively operatively associated therewith and positioned at said terminal portion of said shock absorber adapted to be attached to an unsprung mass.

5. The shock absorber in accordance with claim 4 wherein said first and second adjustment means each comprises an eccentric cam cooperating with the termini of said first and second metering means.

6. The shock absorber in accordance with claim 5 wherein the termini of each of said first and second metering means opposite said smaller diameter end is provided with a peripheral groove which is engaged by an eccentric stub shaft of an adjusting screw accessible from the exterior of said shock absorber.

7. The shock absorber in accordance with claim 6 wherein a second pressure tube circumscribes said hollow piston rod and is adapted to carry a gas therein.

8. A shock absorber having a pressure tube with a reciprocable piston therein; a hollow piston rod extending from said piston to a terminal portion of said shock absorber and being adapted to be attached to an unsprung mass; said piston having a primary fluid passageway through which fluid flows through during a compression stroke and a secondary passageway through which fluid flows during a rebound stroke, said fluid flow taking place from one side of said piston to the other; a first metering means disposed within said hollow piston rod for selectively metering fluid flow through said piston during the compression mode and a second metering means disposed within said hollow piston rod for selectively metering fluid flow through said piston during the rebound mode, said first and second metering means being coaxially and concentrically disposed with respect to each other and being externally adjustable so as to permit and vary the rate of fluid flow through said piston in a selectable manner.

9. The shock absorber in accordance with claim 8 wherein said first metering means has an axial bore and is shiftably movable into and out of a central orifice within said piston through which fluid flows during the compression intake of said piston.

* * * * *